(12) United States Patent
Meador et al.

(10) Patent No.: US 7,431,202 B1
(45) Date of Patent: Oct. 7, 2008

(54) SYSTEM AND METHOD TO MONITOR CREDIT CARD TRANSACTIONS

(76) Inventors: Clifford Anthony Meador, 12132 Bailey Ave., #4, Garden Grove, CA (US) 92845; Lester Dean Moore, 6201 N. Front St., Philadelphia, PA (US) 19120

( * ) Notice: Subject to any disclaimer, the term of this patent is extended or adjusted under 35 U.S.C. 154(b) by 443 days.

(21) Appl. No.: 11/082,133

(22) Filed: Mar. 16, 2005

Related U.S. Application Data

(60) Provisional application No. 60/554,068, filed on Mar. 17, 2004.

(51) Int. Cl.
*G06F 19/00* (2006.01)
(52) U.S. Cl. ................................. 235/379; 235/380
(58) Field of Classification Search .............. 235/379, 235/380, 375; 705/26, 65, 67, 70, 75, 417
See application file for complete search history.

(56) References Cited

U.S. PATENT DOCUMENTS

2007/0173266 A1* 7/2007 Barnes, Jr. ............... 455/456.1

* cited by examiner

*Primary Examiner*—Karl D. Frech
(74) *Attorney, Agent, or Firm*—Gregory L. Roth

(57) ABSTRACT

A transaction verification system and method includes a central station coupled to receive transaction data from a plurality of transaction locations at which a person having an account identification document and a mobile communication device that is associated with the account identification document transacts business. If the central station receives a request for a transaction from a location that is consistent with normal usage of the account identification document, the central station approves the transaction. If the central station receives a request for a transaction from a location that is not consistent with normal usage of the account identification document the central station contacts the person through the mobile communication device and approves the transaction only if the person is authenticated using the mobile communication device. In one embodiment the mobile communication device is a cellular telephone that includes a GPS receiver and transmits location information to the central station and usage is considered normal if the location of the cellular telephone at the time of the transaction is within a determined area.

20 Claims, 1 Drawing Sheet

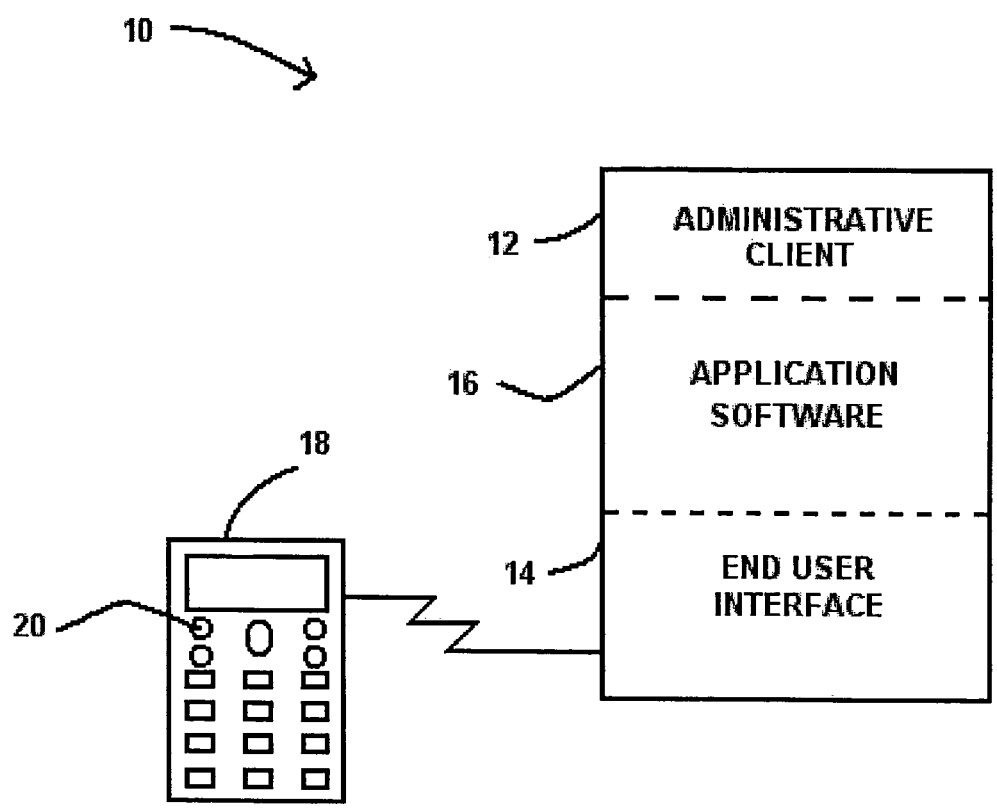

SYSTEM AND METHOD TO MONITOR CREDIT CARD TRANSACTIONS

CLAIM TO BENEFIT OF PROVISIONAL APPLICATION

This patent application claims the benefit of prior-filed provisional application No. 60/554,068, filed Mar. 17, 2004.

BACKGROUND

The present software invention relates generally to a system and method utilized to monitor secured and non-secured credit/debit card usage transactions.

This invention relates generally to fraud prevention software tools and specifically to the business of monitoring credit/debit card transactions at transaction stations and the provision of its information. In particular the software in this invention concerns the interception of payment/usage transactions for the purpose of transmitting encrypted real time data and storing historical usage data.

The present software invention is comprised of gathering credit/debit card transaction data from transaction stations and submitting a usage alert to an end user's/subscriber's remote mobile personal communication device, when an end user's issued credit/debit card is used to make a sale/service purchase. The usage message alerts are submitted in real time to land line/PBX, cellular phones, the internet (email) WAP-enabled mobile devices and PDA's. The end user or receiver of the message alert is prompted to act on the message information that has been delivered. He or she is given the option to confirm that the transaction data received is valid/confirm or to report the invalid transaction to the issuing credit card companies fraud department. Once the end user selects the confirm option button/prompt, they are then given the option to enter a predetermined pass code to archive the purchase transaction. If the end user selects the invalid transaction option button or command, a second option button is used as a hot button to transfer the end user communication via phone, to the credit/debit card company's fraud department. The invalid transaction prompt option is preprogrammed with the issuing credit card company's fraud department phone number.

The system and method of the invention further provides a real time fraud protection improvement for Internet related purchases. Utilizing a mapping program feature, the credit/debit card end user has the ability to monitor transactions in real time as they are processed. The use of the mapping utility will be used to confirm the card user's location at the time of purchase and the merchants location at the time of purchase processing. This provides an additional level of protection for Internet credit/debit card purchases.

This invention also provides an administrative client application, which is utilized to obtain new account information as it relates to member services. Example information that can be gathered is as follows: Client name, client address, existing cell/PDA/home phone number, email address, confirmation pass code, transaction and account numbers etc. This information is used to establish the initial database for the client/end user file.

The present invention also provides additional added value features which are as follows: The end user will be advised if he or she is approaching and then has reached their maximum credit card limit. The invention will provide alert information for billing notices. Prompts will appear advising the end user that the current credit card bill is due or if late charges will be incurred on the monitored card.

The software invention can also provide enhancements and location specific targeted marketing messages for related added value goods and services. This invention provides its end users with the ability to tailor their alert messages as follows: Cardholder/subscriber will have the option to add additional credit cards and debit cards to the monitor/watch list. They can only be added if the issuing card company has granted permission to access their card transaction data. The end user can select a minimum Dollar purchase amount for notification purposes. The end user can temporarily disable the alerts if requested. The end user will have the option to obtain historical transaction activity if requested. The end user will have the option to monitor specific geographic areas by zip code, state, or mileage specific transaction locations. The software invention also provides the end user the ability to monitor transactions by time of day and days of the week. The end user will also have the option to call forward their message alerts to an alternate phone number or email address if requested. Finally the software invention will track purchase activity for a specific merchant or vendor that has been requested to be added to the watch list.

SUMMARY OF THE SOFTWARE INVENTION

The present software invention provides existing and newly issued credit/debit cardholders with the ability to monitor their sales/service transactions remotely. The transaction activity is provided to the end user/cardholder in the form of a message alert. The transaction alerts can be delivered in varying forms. They are via text messages, voice messages or email messages. The alert messages themselves are designed to be delivered to land/PBX, cellular devices, Internet devices(email), WP-enabled mobile devices and PDA's. The end user is prompted to act on the delivered message, which is then confirmed and stored or used to notify credit/debit card issuing companies of fraudulent transactions.

The present software invention provides the end user/cardholder with a number of additional options included in the software product. The additional features have been defined specifically in prior pages of this document. The primary objective of this software invention is to provide end user/cardholders with an additional level of protection for traditional and Internet credit/debit card purchases. This is achieved through the use of real time sales/service data transmission alerts to fixed and remote portable devices.

A transaction verification system and method includes a central station coupled to receive transaction data from a plurality of transaction locations at which a person having an account identification document and a mobile communication device that is associated with the account identification document transacts business. If the central station receives a request for a transaction from a location that is consistent with normal usage of the account identification document, the central station approves the transaction. If the central station receives a request for a transaction from a location that is not consistent with normal usage of the account identification document the central station contacts the person through the mobile communication device and approves the transaction only if the person is authenticated using the mobile communication device. In one embodiment the mobile communication device is a cellular telephone that includes a GPS receiver and transmits location information to the central station and usage is considered normal if the location of the cellular telephone at the time of the transaction is within a determined area.

BRIEF DESCRIPTION OF THE DRAWING

The drawing shows a block diagram representation of a transaction monitoring system and method in accordance with the invention.

DETAILED DESCRIPTION OF THE SOFTWARE INVENTION

The present software invention 10 is comprised of three major components. They are the Administrative Client 12, the End user Interface 14 and the Application software 16 which is utilized to transmit alert data to traditional, Internet enabled and mobile devices. The first of the three components is the Administrative Client application. The administrative client 12 is used to gather relevant new account information as it relates to member services. The information obtained via a web-enabled interface is transmitted to a secured web server, which maintains all exiting end user/subscriber information. The information obtained can be used to match end user/subscriber credit/debit card transaction information to a specific data location or field. The matched transaction history is stored for possible future retrieval. The end user data stored within the data base includes the following: The end user's name, end user's current residential and business address if applicable, existing home, business and cellular phone numbers, email address (home/business), issuing credit/debit card companies fraud department phone number, credit/debit cards to be monitored, security verification information . . . username, ex mothers maiden name etc., and a selected pass code field which is used to confirm sales/service credit/debit card purchase transactions.

The User interface 14 is the second major component of the present software invention. This application is designed to communicate with an end user personal communication device 18, such as a cellulartelephone or telephone equipped PDA, to give the end user/subscriber real time information that he or she can use to make informed judgment decisions about credit/debit card purchases. The interface 14 is designed with the end user/subscriber specifically in mind. It provides the following options and information: The end user/subscriber is given the option to confirm text/voice/email sales/service transaction alerts that are submitted to a remote fixed or mobile device. The invention then gives the end user/subscriber a prompt to enter a pass code to electronically confirm the transaction. If the end user receives a text/voice or email transmission alert that is not valid, he or she will then be directed by the software to select the invalid transaction button 20 or option prompt. This action will then prompt the software of the personal communication device to call a preprogrammed phone number, which connects the end user/subscriber directly to the fraud department of the issuing credit/debit card company. This function allows the credit/debit cardholder to receive real time transaction data and accurately monitor their card history. The end user/subscriber interface included in the invention also allows the end user/subscriber to be advised if he or she is approaching and then has reached their maximum credit limit. This alert feature gives the end user/subscriber additional information for spending management. This invention will also send current and past due billing alert notices when applicable. Alert prompts will appear advising the end user/subscriber that their current credit card bill is due or if late charges will soon be incurred. The invention with currently developed enhancements will provide location specific target marketing messages for related goods and services. The invention will provide the end user/subscriber with the interface option to add additional credit/debit cards to the existing watch list, for purchase transaction monitoring.

The end user interface 14 will provide the subscriber with the option to select a minimum transaction dollar amount to process a message alert. If the end user/subscriber only wishes to be alerted of transactions over $50.00, he or she can select that or other dollar amount options. The end user interface 14 can provide the subscriber the option to temporarily disable the message alert service and store all of the transactions that occurred while the service was disabled. When the service is enabled, the stored transactions will appear as stored current message alerts. The invention will provide the end user/subscriber with the ability to obtain historical transaction information. If the end user/subscriber wishes to access his or her last 10/20 etc. transactions, the history option prompt can be selected to provide this information. The end user interface 14 can provide the subscriber with specific geographic monitoring options. They are zip code specific, state specific, mileage specific, and vendor specific. Transactions can also be monitored by time of day and day of the week. The end user interface 14 can also give the end user/subscriber the option to call forward his or her transaction message alerts to another phone number or email address. If the end user/subscriber wished to forward his or her alerts to a home phone number for Internet credit/debit card purchase confirmations, this can be accomplished with the web based end user interface.

The third major component of this invention is the scaleable application system and software installed on a computer system at a central station. The application software is used to provide the backbone connectivity between the data base source and the remote web based interface hardware devices of the end user/subscribers. The application software is designed to be secure and scaleable. Its standard installation includes encrypted data transmission and various authentication techniques ranging from conventional PIN protocol to the use of public key infrastructure (PKI). All relevant credit/debit card transaction and payment information is stored in one central secured location. This provides an additional level of data security. The current invention supports a variety of alert messaging methods, they include voicemail, email, fax and SMS (Short Messaging Service), which facilitates the transmission of alert messages between the data source and the end user/subscribers. The invention also includes a customizable universal gateway, which is the key component, which completes the integration of targeted message services that enable true E-CRM (electronic customer relationship management). The application software delivers message alerts through a seamless data gateway. This allows secure and dedicated connections that are needed to retrieve enterprise data to be processed in the application modules. Connectivity for the invention is obtained through the use of WAN (Wide Area-Network) or TCP/IP protocol with SSL (Secure socket layers) and LDAP directory services. The invention utilizes a device gateway to transform data from data application modules to formats suitable for use in a wide variety of wired and wireless networks including CDMA (Code Division Multiple Access), GSM (Global System for Mobile Communication), TDMA (Time Division Multiple Access), CDPD (Cellular Digital Packet Data), GPRS (General Packet Radio Service (and IP (Internet Protocol).

This enables the invention to be deployed through multiple network service providers without the need to establish wireless infrastructure or without changes to supporting architecture. This invention has the ability to process data needed to convert "Browser Specific" data format or voice format before it is sent to the end user/subscriber. The information in a user specific internet-enabled, wireless or wired device can be presented in any of the following languages: WML (Wireless Markup Language), HDML (Handheld Device Markup Language), HTML (Hyper Text Markup Language), XML (Extended Markup Language) and VXML (Voice XML). Each end user/subscriber personal communication device operates and presents the message alert data differently. The layers recognize the capabilities of each wireless or wired device and enable the compatibility of the content delivered to the end user.

What is claimed is:

1. A method of transacting business comprising the acts of:
presenting an account identification document for the purpose of making a payment, the account identification document identifying an account through which the payment is to be made;
associating a mobile communication device with the account identification document;
determining the present location of the associated mobile communication device;
determining an area of use for the account identification document;
if the mobile communication device associated with the account identification document is within the determined area of use, approving use of the identified account for making the payment; and
if the mobile communication device associated with the account identification document is not within the determined area of use: (1) calling the mobile communication device associated with the account identification document; (2) attempting to obtain information through the associated mobile communication device verifying that an authorized person has presented the presented the account identification document for the purpose of making a payment; and (3) approving use of the identified account for making the payment only if information is obtained through the associated mobile communication device that verifies that an authorized person has presented the account identification document for the purpose of making a payment.

2. A method of transacting business according to claim 1, wherein the account identification document is a credit card.

3. A method of transacting business according to claim 1, wherein the account identification document is a debit card.

4. A method of transacting business according to claim 1, wherein the mobile communication device includes a GPS receiver generating position information indicating the position of the mobile communication device and the act of determining the present location of the associated mobile communication device includes communication of the generated position information to a location that is remote from the mobile communication device.

5. A method of transacting business according to claim 1, wherein the mobile communication device is a cellular telephone.

6. A method of transacting business according to claim 4, wherein the mobile communication device is a cellular telephone.

7. A business transaction system comprising:
an account identification document that is associated with an account from which an amount of money associated with a transaction is to be paid;
a mobile communication device having a GPS receiver generating position information associated therewith;
a plurality of transaction stations generating transaction information including information identifying an account identification document in response a transaction request using an account identification document; and a central station storing information associating the account identification document with a mobile communication device and storing transaction profile information from which a normal transaction profile associated with the account identification document can be determined, the central station receiving information identifying an account identification document from a transaction station at which a transaction is requested, receiving position information from the associated mobile communication device, the central station determining in response to the received position information and in response to the stored transaction profile information whether or not the requested transaction is consistent with a transaction profile associated with the account identification document, the central station authorizing the requested transaction if the requested transaction is consistent with a transaction profile associated with the account identification document, the central station attempting to authenticate the transaction using the mobile communication device and authorizing the transaction only if the transaction is successfully authenticated using the mobile communication device if the requested transaction is not consistent with a transaction profile associated with the account identification document.

8. A business transaction system according to claim 7 wherein the account identification document is a credit card.

9. A business transaction system according to claim 7 wherein the account identification document is a debit card.

10. A business transaction system according to claim 7 wherein the mobile communication device is a cellular telephone.

11. A business transaction system according to claim 7 wherein the central station includes a computer communicating with the transaction station at which a transaction is attempted and with the mobile communication device.

12. A method of transacting business using an account that may be used to make a payment, the method comprising the acts of:
storing account information in a database for each of a plurality of accounts, the account information stored for each of the accounts including information identifying the account and information identifying a communication device associated with the account;
receiving from a point of sale location transaction information identifying a transaction, the transaction information including information identifying a transaction account used to pay for the transaction, the transaction account being an account for which account information is stored in the database;
sending transaction information identifying the transaction to a communication device associated with the transaction account; and
approving the identified transaction in response to receipt of approval information received from the communication device.

13. A method of transacting business according to claim 12, wherein the transaction account is a credit account.

14. A method of transacting business according to claim 12, wherein the transaction account is a debit account.

15. A method of transacting business according to claim 12, wherein the communication device includes a wireless phone.

16. A method of transacting business according to claim 12, further comprising receiving position information indicating a position from the associated communication device and approving the transaction if the indicated position is within a determined area.

17. A method of transacting business according to claim 12, wherein the information identifying an account that is included with the transaction information received from a point of sale location includes an account number identifying the account.

18. A method of transacting business according to claim 12, further comprising storing in the database for each account a telephone number of a fraud department associated with the account; and sending the telephone number of the fraud department associated with the transaction account to the communication device in response to receipt of information from the communication device disapproving the transaction.

19. A method of transacting business according to claim 12, further comprising the act of storing the received transaction information in response to a request to store received from the communication device.

20. A method of transacting business according to claim 12, wherein the communication device provides a wireless connection to the internet and the act of sending transaction information further comprises sending transaction information through the internet.

* * * * *